INVENTOR.
Frank C. Templin
BY John L. Wiegreffe
ATTY.

Dec. 3, 1963 F. C. TEMPLIN 3,113,301

SIGNAL TRANSLATING APPARATUS

Filed Nov. 18, 1959 4 Sheets-Sheet 2

INVENTOR.
Frank C. Templin
BY [signature]
ATTY.

INVENTOR.
Frank C. Templin
BY
John L. Wiegreffe
ATTY.

SIGNAL TRANSLATING APPARATUS

Filed Nov. 18, 1959 4 Sheets-Sheet 4

INVENTOR.
Frank C. Templin
BY [signature]
ATTY.

United States Patent Office 3,113,301
Patented Dec. 3, 1963

3,113,301
SIGNAL TRANSLATING APPARATUS

Frank C. Templin, Chicago, Ill., assignor to Admiral Corporation, Chicago, Ill., a corporation of Delaware Filed Nov. 18, 1959, Ser. No. 853,972
3 Claims. (Cl. 340—347)

This invention relates to apparatus for translating signals and in particular for producing single indications representative of various combinations of a plurality of incoming signals. It is an object of the invention to provide improved apparatus of this character.

Apparatus constructed in accordance with the preferred embodiment of the invention is responsive to a plurality of simultaneously received signals, each of the signals being characterized by a separate channel and by two, discrete, alternative values. Each signal, for example, has only two values, arbitrarily designated as zero and plus one, and each signal is received on an entirely separate channel. The apparatus converts these signals to angularly displaced vectors, each vector having a magnitude and direction determined by the two characteristics of the respective signal, namely the value and the channel thereof. The apparatus produces a single indication which is determined by one of the two characteristics of the sum or resultant of the vectors. A single indication is thereby produced, which is representative of one combination of the incoming signals.

While the invention is not limited to apparatus which is capable of producing a distinguishable indication of every possible combination of the incoming signals, it is desirable that it be capable of producing distinguishable indications representative of a major portion of all possible combinations of the incoming signals. As is explained in detail below, a much larger number of the possible signal combinations may produce representative and distinguishable output indications if the vectors which are produced by the input signals are non-symmetrical as to their magnitudes or their directions or both, particularly where the number of incoming signals is greater than three.

Apparatus constructed in accordance with the present invention may respond, for example, to signals such as those which characterize a binary coded system, and may produce single indications representative of the values represented by the various signal combinations.

Accordingly it is another object of the invention to provide improved apparatus for producing single indications representative of substantially all combinations of a plurality of signals.

It is a further object of the invention to provide improved apparatus for producing single indications representative of substantially all combinations of a plurality of signals, each such signal being characterized by a separate channel and by two, discrete, alternative values.

It is a still further object of the invention to provide improved apparatus for producing single indications representative of various combinations of a plurality of signals, each signal being characterized by a separate channel and two, discrete, alternative values, which apparatus provides for conversion of such signals to angularly displaced vectors having magnitudes and directions determined by said characteristics of the respective signals, and for producing a single indication determined by one of the characteristics of the resultant of the vectors.

Another object of the invention is to provide improved apparatus for producing single indications representative of various combinations of a plurality of signals, each signal being characterized by a separate channel and two, discrete, alternative values, which apparatus provides for conversion of such signals to angularly displaced vectors having magnitudes and directions detremined by such characteristics of the respective signals, and said vectors being non-symmetrical as to at least one of the characteristics thereof, and for producing a single indication determined by one of the characteristics of the resultant of the vectors.

A further object of the invention is to provide improved apparatus for producing single indications representative of a binary coded signal.

Further features of the invention pertain to the particular arrangement of the elements of the Signal Translating Apparatus, whereby the above outlined and additional features thereof are attained.

The invention, both as to its organization and method of operation, together with further objects and advantages thereof, will best be understood by reference to the following specification, taken in connection with the accompanying drawings, in which:

FIGURE 1 is a combined schematic and vector diagram showing a signal translating system for four signals and illustrating one form of the present invention;

FIG. 1*a* is a vector diagram showing twelve, distinguishable, resultant vectors obtainable with the system of FIG. 1;

FIGS. 2 and 2*a* are diagrams similar to FIGS. 1 and 1*a* but illustrating a modified, four-signal system;

FIGS. 3 and 3*a* are diagrams generally similar to FIGS. 1 and 1*a* but illustrating four-signal and multiple-signal systems having symmetrical vectors;

FIGS. 4 and 4*a*, 5 and 5*a*, and 6 and 6*a* are diagrams similar to FIGS. 1 and 1*a* but illustrating various three-signal systems;

Figure 1:
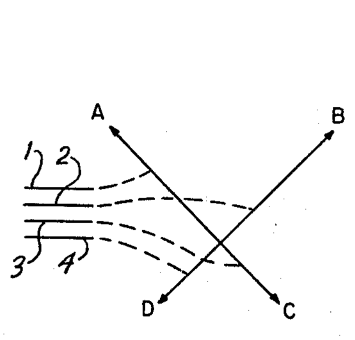

One form of the invention is illustrated schematically in FIG. 1 wherein channels 1, 2, 3 and 4 are provided for four incoming signals. The signals which are received through the channels 1, 2, 3 and 4 are converted, in accordance with the present invention, to angularly displaced vectors, for example the vectors A, B, C and D of FIG. 1, these vectors corresponding respectively to signals carried by the channels 1, 2, 3 and 4. The vectors A, B, C and D have, of course, two characteristics each, namely magnitude and direction. These two characteristics of each vector are determined by two characteristics of the respective signal, namely a value thereof and its channel. The system of FIG. 1 is arranged to handle signals which have only two, discrete, alternative values, which may be designated as zero and plus one, the absolute and relative values being entirely arbitrary.

While physically separate channels are illustrated in FIG. 1 for the four signals, it will be appreciated that channels for the signals may be distinguished in many ways other than physical separateness. For example, electric, electro-magnetic or sound signals of differing frequencies or magnitudes may be transmitted over the same physical channel, the signal channels being distinguished by the signal frequencies or magnitudes. In radio, television and telephony it is common practice to distinguish between signals by their frequencies. In television and telephony, signals of different frequencies are referred to as being transmitted over different channels. Still further, identical signals may be transmitted over the same physical channel, the signal channels being distinguished by the relative time or sequence of the signals.

It is important to the operation of the present invention only that the various signals have an identifying characteristic such that they may be treated separately, this characteristic of signals commonly being referred to, and being readily treatable, as constituting a signal channel. Where "channels" are referred to herein it is intended that the term be given this conventional, broad interpretation.

In the example of FIG. 1 it will be noted that the four signals carried by the four channels 1, 2, 3 and 4 produce vectors A, B, C and D separated by angles of 90°. The vectors are, however, of different magnitudes, the magnitudes of vectors A and B being equal and substantially larger than the vectors C and D, which may also be equal. In this illustrated example the relative angle or direction of each vector is determined by the channel 1, 2, 3 or 4, of the corresponding signal, and its magnitude is determined by the value, zero or plus one, of the corresponding signal. Also in this illustrated example, the alternative value of each signal is, in fact, zero, whereby the alternative magnitude of the corresponding vector is zero. If desired, the active or plus one values of the signals may be equal, the different magnitudes of the vectors being effected in the conversion of the signals to vectors. It is intended that an indication be produced of the direction of the resultant vector, this resultant vector being produced by various combinations of one, two or three of the vectors A, B, C and D, and therefore, by corresponding combinations of one, two or three of the signals being of plus one valve.

Four different indications can obviously be produced by any single one of the four signals being of plus one value. More particularly, if the signal on channel 1 has a plus one value and the signals on the remaining channels have a zero value, only the vector A will appear, and an indication may be produced which is determined by the direction of the vector A. Similarly, indications of the directions of the vectors B, C or D may be produced when the signals on channels 2, 3 or 4 are given a plus one value while the other three signals have a zero value.

Figure 1A:
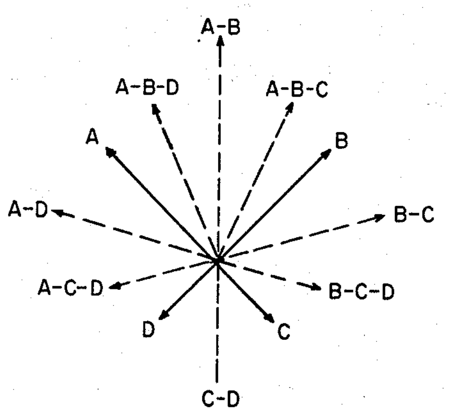

Referring to FIG. 1*a* it may be seen that a substantial number of additional indications may be obtained corresponding to the direction of vectors which are the resultant of two or more of the vectors A, B, C and D. In the interest of clarity, these resultant vectors are illustrated in phantom lines in FIG. 1*a*. When the signals on channels 1 and 2 are given a plus one value while the other signals are of zero value, the resultant vector A—B is produced, lying intermediate the vectors A and B. This resultant vector A—B may accordingly produce an indication determined by the direction of this resultant vector and representative of the corresponding signal combination. Similarly, indications may be produced which are determined by the angle of resultant vectors B—C, C—D and A—D, and representing plus one values for the signals 2 and 3, 3 and 4, and 1 and 4 respectively, the other two signals being of zero value in each case. Still further, resultant vectors A—B—C, B—C—D, A—C—D, and A—B—D lie at various intermediate angles and may thereby produce additional indications representative of plus one values for the corresponding signal combinations.

Twelve indications may thereby be obtained of twelve combinations of the two, discrete, alternative values of the four signals. In this simple illustration four of the sixteen possible combinations are not employed. One of these is the vector combination A—C, which would lie in the direction of the vector A. Another is the vector combination of B—D which would lie in the direction of the vector B. A third is the vector combination A—B—C—D which would lie in the direction of the vector A—B. The fourth combination which is not employed is that in which all four signals are of zero value and all four vectors are of zero magnitude. Use of this last combination would require that the system provide for a "normal" position of the indicator, a position to which the indicator would be drawn when all of the vectors are of zero magnitude. This may be accomplished where desired. In one physical embodiment of the invention described below, means are provided for effecting a normal position for the indicator.

Figure 2:
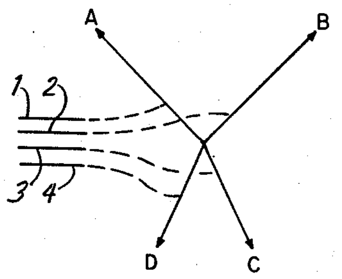

In FIG. 2 there is shown a modification of the system illustrated in FIG. 1. In accordance with this modification the four vectors A, B, C and D are not only of unequal magnitudes but are displaced from each other at unequal angles. More particularly, vectors A and B are displaced by an angle of 90° the vectors C and D are displaced by an angle of 45°, and the vectors B and C and the vectors A and D are displaced by angles of 112.5°. The vectors A and B are of equal magnitude and the vectors C and D are of equal magnitude, the latter having magnitudes of .75 times the magnitudes of the vectors A and B.

Again it is intended that a single indication be produced which is determined by the direction of the resultant vector comprising the sum of various combinations of the vectors A, B, C and D. Four directions, and hence four possible indications, are illustrated in FIG. 2, these being the directions of the individual vectors A, B, C and D which may be produced by a single, corresponding signal being of plus one value. Various resultant vectors obtainable by combining the vectors A, B, C and D of FIG. 2 are shown in phantom lines in FIG. 2*a*. Four resultant vectors may be obtained by combining adjacent vectors, these resultant vectors being labeled A—B, B—C, C—D, and A—D in FIG. 2*a*. Four more resultant vectors, namely A—B—C, B—C—D, A—C—D and A—B—D may be obtained by the four possible combinations of three vectors. These twelve vectors are generally comparable to the twelve vectors of FIG. 1*a*.

The system of FIG. 2 has one advantageous characteristic over that of FIG. 1. The various resultant vectors produced by the system of FIG. 1 are somewhat irregularly spaced, as may be seen in FIG. 1*a*, as well as in the subsequent description of apparatus operating in accordance with the system of FIG. 1. The vectors produced by the system of FIG. 2 are spaced apart by angles which are substantially integral multiples of 22.5°. The advantage of this system will become apparent in the subsequent description of apparatus.

An important characteristic of the invention as applied to systems which handle more than three signals or data bits is illustrated in two different forms in the systems of FIG. 1 and FIG. 2. In each case the vectors A, B, C and D differ in at least one of their two characteristics, namely magnitude and direction. In the system of FIG. 1 the vectors A, B, C and D are symmetrical as to their directions but are non-symmetrical as to their magnitudes. In the system of FIG. 2 the vectors A, B, C and D are non-symmetrical as to both their magnitudes and their directions. Non-symmetry of the vectors as to either of their two characteristics permits distinction of a substantially larger number of the possible signal combinations than is possible if the vectors are symmetrical both in magnitude and direction.

Figure 3:
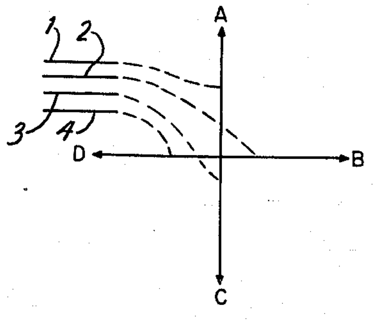
Figure 3A:
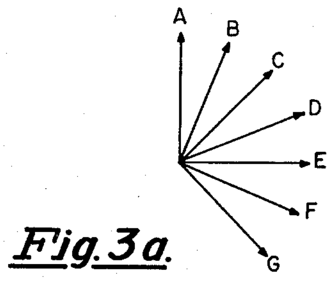

The adverse effect of vector symmetry on the total number of distinguishable vector combinations (and hence signal combinations) may readily be appreciated upon reference to FIGS. 3 and 3*a*. In FIG. 3 four symmetrical vectors A, B, C and D are employed. It will be apparent that the resultant of the vectors A and C is zero. This fact eliminates not only the resultant vector A—C but also any combination of vectors including the vectors A and C, namely A—B—C and A—C—D. The same holds true for the resultant of the vectors B and D. Accordingly, only the adjacent pairs of vectors may be combined to produce resultant vectors which are distinguishable over the basic vectors. Only eight of the fifteen possible vectors (excluding the zero vector) are therefore obtainable.

This objection to symmetrical vectors becomes increasingly disadvantageous as the total number of vectors and signals is increased. In FIG. 3*a* a portion of a system employing a large number of signals and vectors is illustrated. It will be apparent that the resultant vector A—C will be indistinguishable from the vector B where the indication is determined by the direction of the resultant vector. The resultant vector A—E will be indistinguishable from the vector C, and the resultant vector A—G will be indistinguishable from the vector D. In such a symmetrical system, these and many other resultant vectors will be indistinguishable from the basic vectors.

Figure 2A:
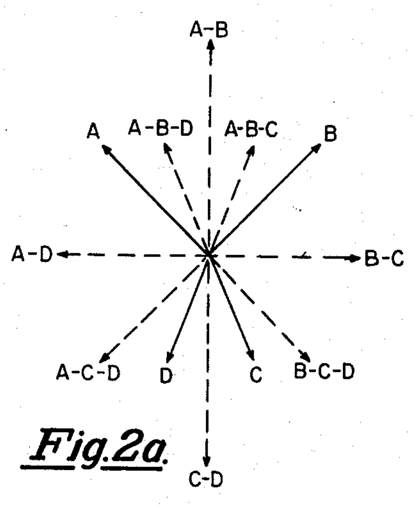

It will now be appreciated that in any system employing four or more vectors and signals, non-symmetry of the vectors as to magnitude or direction substantially increases the number of resultant vectors, and hence the number of signal combinations, which may be distinguished. As illustrated in FIGS. 2 and 2*a*, the vectors may be non-symmetrical as to both of their characteristics. Non-symmetry of the vectors as to both magnitude and direction is in fact recommended in order to provide more, readily distinguishable resultant vectors where a substantial number of signals and vectors is employed.

Figure 4:
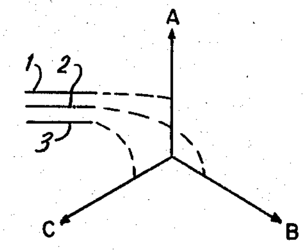
Figure 4A:
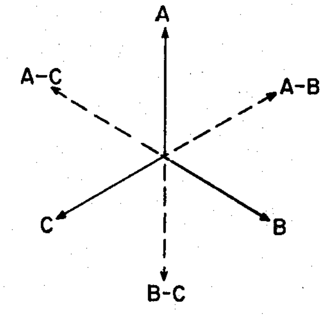

In a system which is intended to handle only three signals, the matter of symmetry or non-symmetry of the vectors becomes of little importance as to the percentage of the total possible signal combinations which may be distinguishably represented. In FIG. 4 three signal channels 1, 2 and 3 are schematically represented. The signals carried by these channels, when they are of plus one value, produce the vectors A, B and C respectively. In this system the three vectors are symmetrical as to both magnitude and direction. In FIG. 4*a* the three possible resultant vectors are shown in phantom lines, these being the resultant vectors A—B, B—C and A—C. Accordingly six of the seven possible signal combinations or vector combinations (excluding the zero vector) are obtainable even though the vectors are symmetrical. The only resultant vector which is not distinguishable is the resultant vector A—B—C, which is indistinguishable from the zero vector. This characteristic of the three-signal or three-vector system results from the simplicity of the system and, more particularly, from the fact that all vector combinations except for the no-signal and all-signal combinations comprise either a single vector or a combinaiton of two adjacent vectors. It will be apparent that two adjacent vectors will always produce a distinguishable resultant vector except in the instance wherein the two vectors are directly opposed to each other.

Figure 5:
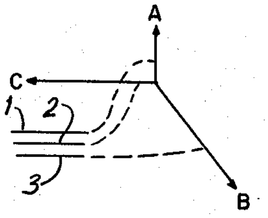

A modification of the system of FIG. 4 is illustrated in FIG. 5 wherein the vectors of a three-signal and three-vector system are made non-symmetrical as to both the magnitude and the direction of the vectors. In this example the vectors B and C are of equal magnitude and are displaced by an angle of 120°. However, the vector A is of much lesser magnitude and is displaced from the vector C by an angle of only 90°. The angle between the vectors A and B is therefore 150°. The various resultant vectors are shown in phantom lines in FIG. 5*a*. Because of the non-symmetry of the vectors A, B and C, the distinguishable resultant vectors include not only the vectors A—B, B—C and A—C, but also the resultant vector A—B—C. With this system all eight of the possible signal combinations are distinguishable, provided that the no-signal or zero vector is made to produce a positive indication.

Figure 6:
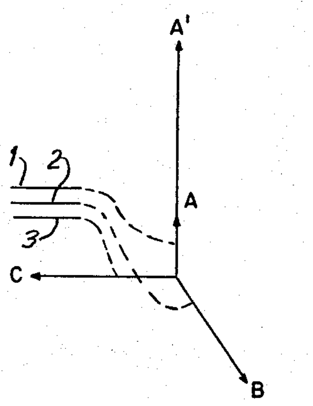

In FIG. 6 there is illustrated a system which is modified over the system of FIG. 5 in that one signal, the signal on channel 1, has three discrete values, one of these being zero and the others being different plus values. In the illustrated system the smaller plus value, producing the vector A, is the same as in the system of FIG. 5, namely a little over one half the value of the plus values of the other two signals. The other plus value of the channel 1 signal, producing the vector A′, is approximately twice the plus value of the other two signals. In this particular system two additional signal combinations may produce distinguishable resultant vectors and hence distinguishable indications representative thereof. These are the vectors A′B and A′C, seen in FIG. 6*a*.

Figure 5A:
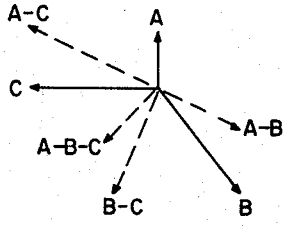
Figure 6A:
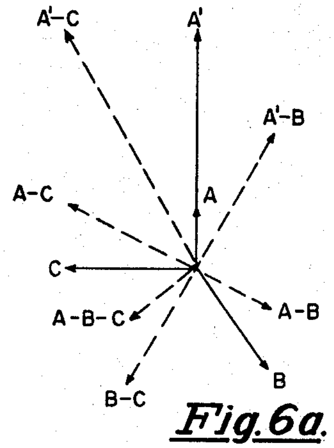

The seven resultant vectors of FIG. 5*a* and the nine resultant vectors of FIG. 6*a* all extend in directions which are spaced from each other in substantially integral multiples of 30°. The advantage of this will become apparent in the subsequent description of apparatus.

The few representative systems illustrated in FIGS. 1–6 and described above are to be understood as merely illustrating the principal of the invention. It will be appreciated by those skilled in the art that a large number of signals of two or more discrete values may be handled, the corresponding vectors to which the signals are converted being made non-symmetrical as to their magnitude or direction or both such that a large number of the possible signal combinations may produce resultant vectors which are distinguishable, one from the other, by their directions or magnitudes.

Figure 7:
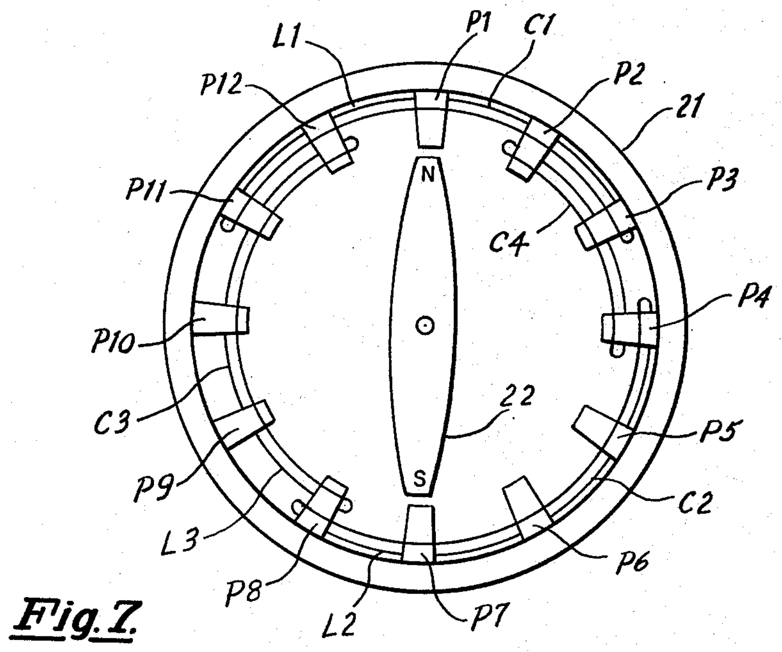
FIG. 7 is a diagramatic illustration of apparatus operable in accordance with the three-signal system of FIG. 5.

In FIG. 7 one form of apparatus is illustrated for converting channeled signals to vectors and for producing single indications representative of the various combinations of signals, the indication being determined by the angle of the resultant vector produced by the signals. The specific apparatus illustrated is responsive to simultaneous D.C. electric signals received on separate conductors and having significant duration. The signals are to have two, discrete, alternative voltages, one voltage of each signal being substantially zero and the other voltages being substantially equal to each other. Finally, the apparatus is arranged to handle three signals, and produces three vectors which are non-symmetrical as to both magnitude and direction in accordance with the system of FIG. 5.

The apparatus includes a magnetic yoke 21 having twelve equally spaced poles designated P1 through P12. A coil C1 encircles five successive poles, P11, P12, P1, P2 and P3. A coil C2, similar to the coil C1 but having a substantially larger number of turns, encircles five successive poles, P4, P5, P6, P7 and P8. A third coil C3 which is identical to the coil C2 encircles the poles P8, P9, P10, P11 and P12. In accordance with a preferred embodiment of the invention a fourth coil C4 encircles three poles P2, P3 and P4, this coil serving to provide a normal or zero-vector indicator position as is explained below.

The three signals which are to be handled by this apparatus are conducted to the coils C1, C2 and C3 through respective leads L1, L2 and L3. It will be appreciated that another lead for each of these three coils may be connected to a suitable return path or ground.

An indicator is provided in the form of a permanent magnet armature 22 which is suitably mounted for free rotation within the yoke 21. The ends of the armature 22 are so proportioned that the armature tends to line up with two opposed poles of the yoke. This produces a magnetic detent effect whereby discrete indications may be obtained even though signal voltages or other parameters of the system vary significantly from prescribed values. It is, nevertheless, required that the magnetic fields which are to attract the armature be substantially centered on a single pole of the yoke, in order that the armature may definitely seek the proper pole and not align itself with one of the adjacent poles. Suitable apparatus, not shown in the drawings, may be connected to or otherwise driven by the armature 22 for indicating the angular position of the armature, visually or otherwise.

Since the details of the apparatus, other than those illustrated in FIG. 7, may be of any suitable form and do not of themselves constitute a feature of the invention, the construction of the apparatus of FIG. 7 is not described in further detail herein.

When a plus one signal is present on the channel or conductor L1, the signals on channels L2 and L3 being zero, a magnetic field will be established which is centered on pole P1 of the yoke 21. A given pole, for example the north pole, of the permanent magnet armature 22 will then be attracted to pole P1 of the yoke. Each of the coils C1, C2, C3 and C4 is preferably wound in such a manner that the same pole of the armature 22 will be attracted thereto when the coil is energized.

The establishment of a magnetic field centered on pole P1 by the application of a plus one signal to the channel or conductor L1 constitutes the conversion of that signal to a vector, namely the vector A of FIG. 5. The direction of this vector is determined by the position of the coil C1 and hence by the channel of the signal, and the magnitude of the vector is determined by the magnitude of the signal. The armature 22 will align itself with the poles P1 and P7, thereby producing a single indication (the angular orientation of the armature) which is determined by one of the two characteristics of the vector A of FIG. 5, namely the direction thereof.

When a plus one signal is present on the channel or conductor L2, the signals on channels L1 and L3 being zero, a magnetic field will be established which is centered on the pole P6 of the yoke, this magnetic field corresponding to the vector B of FIG. 5. Similarly when the coil C3 and the channel or conductor L3 are alone subjected to a plus one signal, a magnetic field is established which is centered on the pole P10, this corresponding to the vector C of FIG. 5.

When the coils C1 and C2 receive a plus one signal the resultant magnetic field will be centered on the pole P5, corresponding to the vector A—B of FIG. 5*a*. The centering of the resultant field on the pole P5 rather than P4 or P3 is explained by the difference in the magnitudes of the two component fields. In the preferred embodiment, the coil C1 has 23 turns to 40 turns for the coil C2. The angle of the resultant field is best appreciated by reference to FIG. 5*a*.

When the coils C2 and C3 receive plus one signals the resultant magnetic field will be centered on the pole P8, corresponding to the vector B—C of FIG. 5*a*. When the coils C1 and C3 receive plus one signals the resultant magnetic field is centered on the pole P11, this corresponding to the vector A—C of FIG. 5*a*. Finally, when a positive signal is received on all three channels, the resultant magnetic field will be centered on the pole P9, this corresponding to the vector A—B—C of FIG. 5*a*.

Through this simple apparatus a plurality of signals having at least two, discrete, alternative values, and having two separate characteristics which may be termed value and channel, may be converted to vectors whose two characteristics, namely magnitude and direction, are determined by the two characteristics of the corresponding signal. The apparatus also produces single indications which are determined by one of the two characteristics of the resultant vector, namely its direction, and which are therefore representative of the corresponding signal combinations.

The apparatus of FIG. 7 as so far described can produce distinguishable indications of seven of the eight possible signal combinations (assuming each signal to have only two, discrete, alternative values). The only signal combination for which the apparatus of FIG. 7 has no distinguishable, representative indication is that combination wherein all three signals are of zero value. Apparatus is shown in FIG. 8 which, in combination with the above mentioned coil C4 of FIG. 7, will produce a definite, distinguishable indication representative of the combination of three zero value signals.

Figure 8:
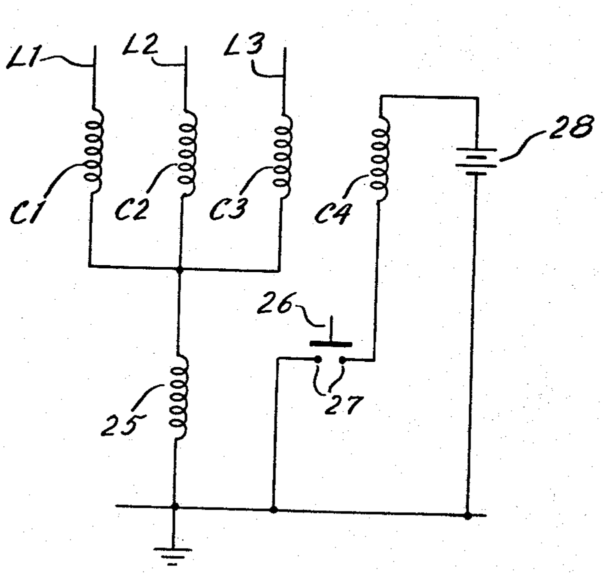
FIG. 8 is a circuit diagram of apparatus usable with the apparatus of FIG. 7 to produce an indication representative of a signal combination wherein all three signals are of zero value.

In FIG. 8 the four coils C1, C2, C3 and C4 are illustrated diagramatically. The ends of the coils C1, C2 and C3 opposite the signal input leads L1, L2 and L3 are connected in common to one end of a relay coil 25, the other end of the coil being connected to ground. It will be appreciated that plus one signals applied to one or more of the leads L1, L2 and L3 will pass through the corresponding coils C1, C2 and C3 and then through the relay coil 25 to ground.

The relay coil 25 controls a relay armature 26 which opens relay contacts 27 when the relay coil 25 is energized by one or more signals, the armature 26 bridging the contacts 27 when all three signals are of zero value such that the relay coil 25 is deenergized. It will be seen that the coil C4 is connected through the contacts 27 to the terminals of a suitable power source 28.

It will now be appreciated that when the three signals are of zero value, the coil C4 will be energized, and the north pole of the armature 22 of FIG. 7 will be drawn into alignment with the pole P3 of the yoke 21. It will be apparent upon reference to FIG. 5*a* that this position of the armature 22 is readily distinguishable from the other seven positions of the armature. It should be noted that the apparatus of FIG. 8 does not call for the introduction of an additional or fourth signal. All eight positions of the armature 22 are controlled by the three signals applied to the channels or coils C1, C2 and C3, and are representative of the eight possible combinations of these three signals. The relay 25–27 and the coil C4 serve to produce the eighth vector indirectly, whereas the other seven vectors are produced directly by the signals in this embodiment of the invention.

The apparatus of FIGS. 7 and 8 may be modified, primarily as to its application, to operate in accordance with the system described above in connection with FIG. 6. For this purpose the coil C1 of FIG. 7 may be given the same number of turns as the coils C2 and C3. It may, however, have the same, reduced number of turns, and it is so treated in the ensuing description of the apparatus as applied to the system of FIG. 6.

In accordance with the system of FIG. 6 the signal applied to the first channel has two, discrete, plus values in addition to its zero value. Where the coil C1 has 23 turns against 40 turns for the coils C2 and C3 as indicated above, the lower plus value of the first signal may be equal to the single plus values of the signals which are fed to the second and third channels. The larger plus value of the number one signal should then be on the order of 3¼ times the smaller plus value. The magnetic field produced by the larger plus value of the number one signal then has substantially twice the magnitude of the field produced by the number two or number three signal. The smaller plus value of the number one signal will then produce the vector A of FIG. 6 or the A component of the vectors A—B, A—C and A—B—C. The larger plus value of the number one signal will produce the larger vector A′, and the A′ component of the vectors A′—B and A′—C. Reference to FIG. 6*a* reveals that the magnetic field represented by the vector A′—C is substantially centered on the pole P12 and that the pole P2 is substantially aligned with the vector A′—B.

It will now be seen that the apparatus of FIG. 7 lends itself to the utilization and handling of signals having more than two, discrete, alternative values. It will also be apparent to those skilled in the art that modifications may be required in the apparatus of FIG. 7 where two or more of the signals are to have three or more discrete, alternative values. More particularly, it may be necessary to introduce greater non-symmetry of the basic vectors as to their directions or their basic magnitudes or both.

Figure 9:
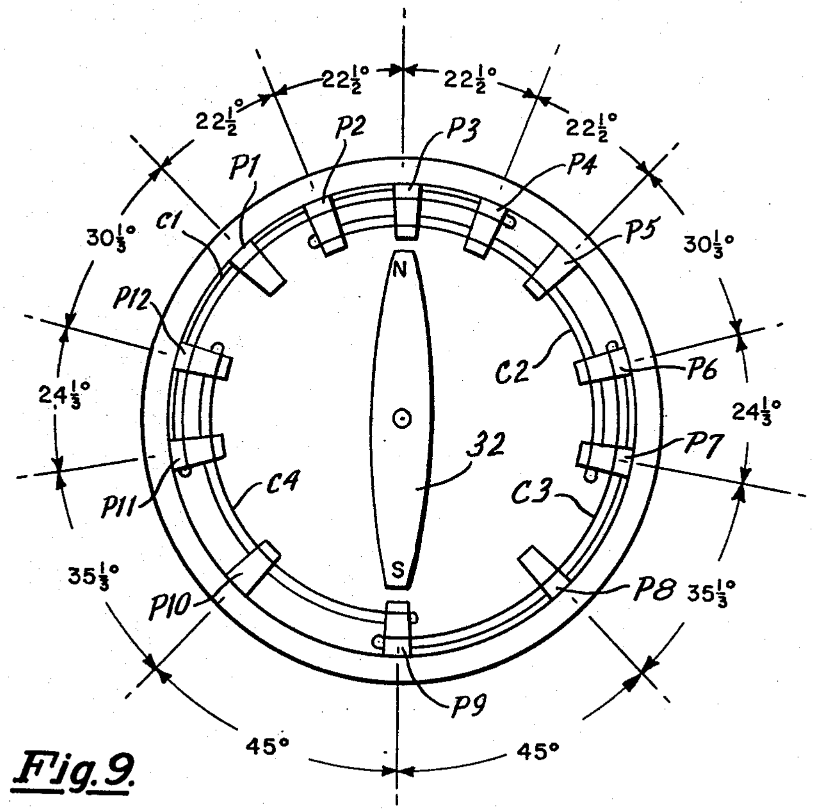
FIG. 9 is a diagrammatic illustration similar to FIG. 7 but illustrating apparatus operable in accordance with the four-signal system of FIG. 1; and, FIG. 10 is a similar diagramatic illustration of apparatus operable in accordance with the four-signal system of FIG. 2.

A modification of the apparatus of FIG. 7 is shown in FIG. 9 which is arranged to operate in accordance with the system of FIG. 1. More specifically, it is arranged to handle four signals each characterized by a separate channel and two, discrete alternative values. As in the case of the apparatus of FIG. 7, this apparatus is responsive to simultaneous D.C. electric signals received on separate conductors and having significant duration. One voltage value of each signal is substantially zero and the other voltages may be equal to each other.

The apparatus produces four vectors which are symmetrical as to direction but non-symmetrical as to magnitude.

The apparatus of FIG. 9 includes a yoke 31 having twelve poles designated P1 through P12. For reasons which will subsequently become apparent these poles are not symmetrically arranged. A first coil C1 encircles six poles P11, P12, P1, P2, P3, P4, and a second coil C2 also encircles six poles, namely poles P2, P3, P4, P5, P6, P7. A third coil C3 encircles four poles P6, P7, P8 and P9 and a fourth coil C4 also encircles four poles P9, P10, P11, P12. A permanent magnet armature 32, similar to the armature 22 of FIG. 7 is arranged to be attracted toward and to align itself with the center of resultant magnetic fields established by signals fed to the four coils.

When a positive signal is fed to coil C1 only, a magnetic field is established which is centered about the pole P1. Since the coil C1 encircles an even number of poles, it will be apparent that the poles must be non-symmetrical if the magnetic field established by the coil C1 is to be centered about a single pole. The non-symmetry of the six poles encircled by the coil C1 causes the pole P1 to lie at or near the center of the magnetic field produced by the coil C1. The magnetic field produced by the coil C1 alone is represented by the vector A in FIG. 1.

When the coil C2 is alone energized, a magnetic field is produced which is centered on the pole P5. Again, non-symmetry of the six encircled poles places one pole substantially at the center of the magnetic field produced by the coil. The magnetic field produced by the coil C2 is represented by the vector B in FIG. 1. The magnetic fields produced by the coils C1 and C2, and hence the vectors A and B are of the same magnitude since the coils have the same number of turns, they encircle like numbers of poles, and the plus one values of the signals which may energize the coils are equal.

When the coil C3 is energized by the third signal it produces a magnetic field centered on the pole P8, non-symmetry of the four poles encircled by this coil again placing one pole substantially at the center of the field. This magnetic field is represented by the vector C of FIG. 1. The magnitude of this magnetic field, and hence of the vector C, is substantially less than the magnitude of the magnetic fields produced by the coils C1 and C2. This desired difference in field strength may be produced by the lesser number of poles encircled by the coil C3, or from a lesser number of turns in the coil C3, or from a difference in the plus one values of the corresponding signals, as desired. It will be appreciated by those skilled in the art that the effect of the lesser number of poles encircled by the coil C3 will depend to a considerable extent upon the degree of magnetic saturation of the poles.

When the coil C4 is alone energized, by the fourth signal, it produces a magnetic field centered on the pole P10 and of a magnitude substantially equal to the magnitude of the field produced by the coil C3. The field produced by the coil C4 is represented by the vector D in FIG. 1.

It will be apparent upon observation of FIG. 9 that energization of the coils C1 and C2 only, will produce a magnetic field centered on the pole P3, corresponding to the vector A—B of FIG. 1*a*. Energization of the coils C2 and C3 will produce a resultant magnetic field centered on the pole P6, corresponding to the vector B—C of FIG. 1*a*.

Energization of the coils C3 and C4 will produce a resultant magnetic field centered on the pole P9, corresponding to the vector C—D of FIG. 1*a*. Energization of the coils C1 and C4 will produce a resultant magnetic field centered on the pole P12, corresponding to the vector A—D of FIG. 1*a*.

Energization of the coils C1, C2 and C3 will produce a resultant magnetic field centered on the pole P4, corresponding to the vector A—B—C. Energization of the coils C2, C3 and C4 will produce a resultant magnetic field centered on the pole P7, corresponding to the vector B—C—D.

Simultaneous energization of the coils C1, C3 and C4 will produce a resultant magnetic field centered on the pole P11, corresponding to the vector A—C—D. Energization of coils C1, C2 and C4 produces a magnetic field centered on the pole P2, corresponding to the vector A—B—D of FIG. 1*a*.

The very simple apparatus shown in FIG. 9 and described immediately above may be seen to operate on the same principle as the apparatus of FIG. 7 but is adapted to handle four D.C. electrical signals, each characterized by a separate channel (the coils C1, C2, C3 and C4) and two, discrete, alternative voltages, one voltage of each signal being zero and the other voltage having a definite value which may be equal for each signal. This particular apparatus operates in accordance with the system of FIG. 1 in that it produces four vectors which are symmetrical as to their directions but non-symmetrical as to their magnitudes.

As indicated above, the poles of the yoke 31 are made non-symmetrical because of the encirclement of an even number of poles by the various coils, it being necessary that one pole lie near the center of the magnetic field produced by each coil. The non-symmetry of the poles must also provide for the arrangement of a pole near the center of each magnetic field produced by energization of two or more coils, since the centers of the resultant fields are not spaced apart with substantial uniformity. The poles P1 through P12 are preferably spaced apart as indicated in FIG. 9.

Figure 10:
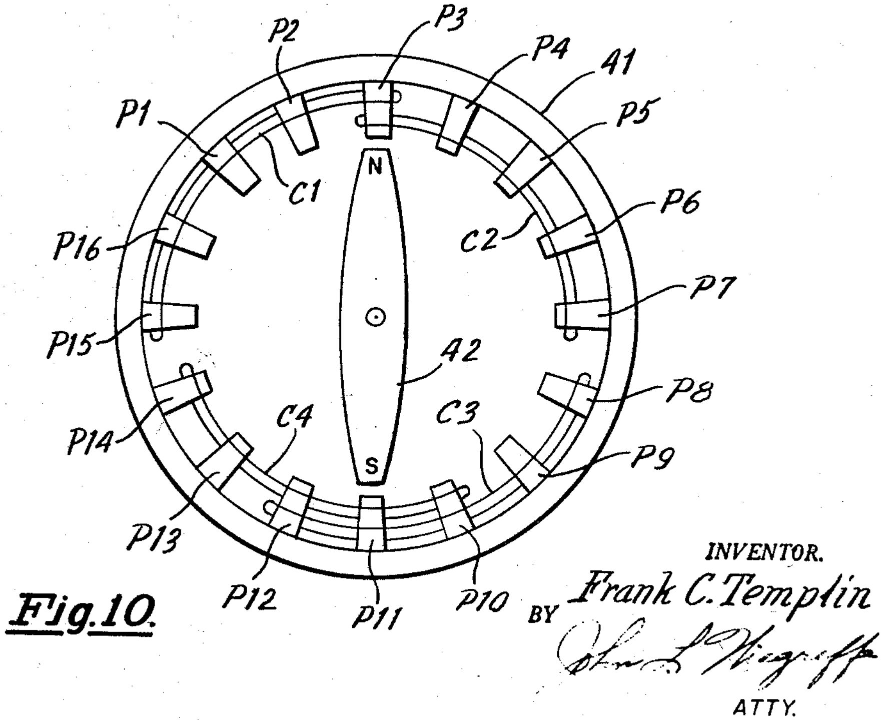

The embodiment of the invention illustrated in FIG. 10 is similar to that of FIG. 9 is arranged to operate in accordance with the system of FIG. 2. This apparatus includes a yoke 41 having sixteen equally spaced poles designated P1 through P16. A coil C1 encircles five successive poles P15, P16, P1, P2 and P3. A similar coil C2 encircles five successive poles P3, P4, P5, P6 and P7. Coils C3 and C4 respectively encircle successive poles P8, P9, P10, P11 and P12, and P10, P11, P12, P13 and P14. A permanent magnet armature 42 is arranged to be attracted toward and to align itself with the center of the resultant magnetic field which results from excitation of one or more of the coils C1, C2, C3 and C4 by one or more D.C. electric signals being applied to the coils. The coils C1 and C2 are given a larger number of turns than the coils C3 and C4 by a ratio of 4:3, or the corresponding signals may be of differing plus one values, such that the magnetic fields produced by the coils are of magnitudes corresponding to the magnitudes of the vectors A, B, C and D of FIG. 2*a*.

The operation of this apparatus is summarized in the table below. The first column of this table indicates the coils which are simultaneously energized by a D.C. signal of plus one value. The second column indicates the pole of the yoke 41 which will lie at the center of the resultant magnetic field, and the third column indicates the corresponding vector of FIG. 2*a*.

| Excited coils | Center Pole | Vector of Fig. 2a |
|---|---|---|
| C1 | 1 | A |
| C2 | 5 | B |
| C3 | 10 | C |
| C4 | 12 | D |
| C1, 2 | 3 | A—B |
| C2, 3 | 7 | B—C |
| C3, 4 | 11 | C—D |
| C1, 4 | 15 | A—D |
| C1, 2, 3 | 4 | A—B—C |
| C2, 3, 4 | 9 | B—C—D |
| C1, 3, 4 | 13 | A—C—D |
| C1, 2, 4 | 2 | A—B—D |

The apparatus of FIG. 10 will be seen to operate on the same general principles as the apparatus of FIGS. 7 and 9, the apparatus of FIG. 10 differing from that of FIG. 9 in that it converts the four incoming signals to vectors which are non-symmetrical as to direction as well as magnitude. Observation of FIG. 2a reveals also that the apparatus of FIG. 10 has the desirable feature of producing resultant magnetic fields which are centered in directions which are spaced apart by angles which are very nearly integral multiples of 22½°. The sixteen poles of the yoke 41 may therefore be symmetrically spaced at 22½°.

It will be readily appreciated that apparatus similar to that illustrated in FIG. 8 may be employed with the apparatus of FIG. 10 to produce a distinguishable vector when the signal supplied to each of the four main coils C1, C2, C3 and C4 is of zero value. The additional coil may be centered on poles P6, P8, P14 or P16 to produce a field or vector which is distinguishable from all other fields or vectors.

An important characteristic of the invention is that each signal is converted to a vector whose magnitude and direction are determined by two characteristics of the corresponding signal. These two characteristics are arbitrarily specified herein as value and channel. In the physical embodiments of of the invention illustrated and described, the value of the signal is the voltage thereof, and the channel of the signal comprises a physically separate channel. As explained above, the channel of the signal may comprise any characteristic of the signal through which it may be identified over the other signals. The value of the signal may also be any characteristic of the signal which may have at least two, discrete, alternative values.

Another important feature of the invention is that the vectors produced by the signals are angularly displaced with respect to each other. This permits distinction between the various resultant vectors by their directions, the final indication being determined by the direction of the resultant vector. It also permits distinction between resultant vectors by their magnitudes, even though two such resultant vectors may be produced by two vectors each, whose total magnitudes are equal. For example, the sum of the magnitudes of the vectors A and B and the vectors A and C of FIG. 5 are equal, but the resultant vectors A—B and A—C of FIG. 5a are different in magnitude as well as in direction. Accordingly, the vectors A—B and A—C of FIG. 5a may be distinguished by their magnitudes as well as by their directions, and may produce distinguishable indications determined by their magnitudes as well as by their directions.

Where the term "resultant vector" is employed herein it is to be interpreted as including individual vectors resulting from a single signal, as well as combinations of two or more vectors resulting from two or more signals.

It will be appreciated by those skilled in the art that the apparatus illustrated in FIGS. 7–10 is merely representative of the kind of apparatus which may be employed in accordance with the present invention. The apparatus may readily be modified to operate on different well known principles while still operating in accordance with the principles of the present invention.

It will also be apparent that the various systems illustrated by the vector diagrams of FIGS. 1–6 are merely representative of innumerable systems obviously falling within the scope of the present invention. By way of example only, other systems falling within the scope of the invention may involve a large number of incoming signals, any one or more of which may have a substantial number of discrete, alternative values. The vectors produced by such signals may, if desired, be symmetrical even though such an arrangement greatly reduces the number of distinguishable resultant vectors and, hence, the number of signal combinations which may be distinguishably represented or indicated.

It will also be appreciated that the signals may be other than electric in character and that the vectors may be other than magnetic in character. Still further, the indicating apparatus may be of various forms, operating in accordance with well known principles, and may represent and be controlled by either the direction or the magnitude of the resultant vector.

Accordingly, while there has been described what are at present considered to be the preferred embodiments of the invention, it will be understood that various modifications may be made therein, and it is intended to cover in the appended claims all such modifications as fall within the true spirit and scope of the invention.

The invention having thus been described, what is claimed and desired to be secured by Letters Patent is:

1. Signal translating apparatus for converting binary electric signals, each characterized by a separate physical channel and at least two discrete, alternative voltages, into decimal signals comprising only a single paramagnetic yoke having a plurality of field poles which are non-symmetrically arranged, an individual field coil for each of said signal channels for converting said binary electric signals to magnetic fields having magnitudes determined by the voltage of the respective signals and directions determined by the orientations of the coils, each of said field coils individually linking at least one of said plurality of field poles and linking at least one other field pole in common with at least one other field coil, whereby the magnetic fields produced thereby are symmetrical as to the directions and non-symmetrical as to their magnitudes when excited by signals of equal voltage, and an armature rotatable with respect to said coils and arranged to align itself with the resultant of the magnetic fields produced by said coils and said signals.

2. Signal translating apparatus for converting binary electric signals, each characterized by a separate channel and only two, discrete, alternative voltages including a zero voltage, into decimal signals comprising only a single paramagnetic yoke having a plurality of field poles which are non-symmetrically arranged, an individual field coil for each of said signal channels for converting said binary electric signals to magnetic fields having magnitudes determined by the voltage of the respective signals and directions determined by the orientation of the coils, each of said field coils individually linking at least one of said plurality of field poles and linking at least one other field pole in common with at least one other field coil, whereby the magnetic fields produced thereby are symmetrical as to their directions and non-symmetrical as to their magnitudes when excited by signals of equal voltage, and an armature rotatable with respect to said coils and arranged to align itself with the resultant of the magnetic fields produced by said coils and said signals.

3. Signal translating apparatus as specified in claim 2 wherein additional means including an additional coil, are provided for producing an additional magnetic field when all of said signals are of zero value, said additional magnetic field being angularly displaced from all others of said magnetic fields.

References Cited in the file of this patent

UNITED STATES PATENTS

| | | |
|---|---|---|
| 2,827,626 | DeMottee | Mar. 18, 1958 |
| 2,974,264 | Depp | Mar. 7, 1961 |

OTHER REFERENCES

Digital to Analogue Shaft Position Transducer (O'Neil), A.I.E.E. Trans., vol. 72, Part 1, March 1953, pages 37–41.